US012020645B2

(12) United States Patent
Pyun et al.

(10) Patent No.: US 12,020,645 B2
(45) Date of Patent: Jun. 25, 2024

(54) CONTROLLER, DISPLAY DEVICE INCLUDING THE SAME, AND METHOD OF DRIVING DISPLAY DEVICE USING THE SAME

(71) Applicant: Samsung Display Co., Ltd., Yongin-si (KR)

(72) Inventors: Kihyun Pyun, Gwangmyeong-si (KR); Sung-In Kang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/075,759

(22) Filed: Dec. 6, 2022

(65) Prior Publication Data

US 2023/0252944 A1 Aug. 10, 2023

(30) Foreign Application Priority Data

Feb. 7, 2022 (KR) ........................ 10-2022-0015314

(51) Int. Cl.
*G09G 3/3233* (2016.01)

(52) U.S. Cl.
CPC ... *G09G 3/3233* (2013.01); *G09G 2300/0842* (2013.01); *G09G 2330/021* (2013.01); *G09G 2330/028* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 5,315,311 A * | 5/1994 | Honkala | G09G 3/30 345/212 |
| 2009/0085901 A1* | 4/2009 | Antony | H05B 47/17 345/211 |
| 2012/0044270 A1* | 2/2012 | Arkhipov | G09G 3/32 345/690 |
| 2012/0299891 A1* | 11/2012 | Fujiwara | G09G 3/3426 345/212 |
| 2016/0155382 A1* | 6/2016 | Cheon | G09G 3/3258 345/76 |
| 2016/0155388 A1* | 6/2016 | Baik | G09G 5/10 345/691 |
| 2016/0293107 A1* | 10/2016 | Jeong | G09G 3/3233 |
| 2020/0357344 A1* | 11/2020 | Pyun | G09G 3/3233 |
| 2020/0365091 A1* | 11/2020 | Pyun | G09G 3/3283 |
| 2021/0256904 A1* | 8/2021 | Kang | G09G 3/3225 |
| 2021/0264877 A1* | 8/2021 | Pyun | G09G 3/3233 |
| 2022/0277683 A1* | 9/2022 | Kang | G09G 3/3258 |

FOREIGN PATENT DOCUMENTS

| | | |
|---|---|---|
| KR | 100893482 B1 | 4/2009 |
| KR | 100894606 B1 | 4/2009 |

* cited by examiner

*Primary Examiner* — Dorothy Harris
(74) *Attorney, Agent, or Firm* — CANTOR COLBURN LLP

(57) ABSTRACT

A display device includes a display panel including a plurality of pixels, a power supply which provides a driving voltage to the pixels, and a controller which outputs a first signal by comparing a sensing driving current generated by sensing driving currents flowing through the pixels with a limit current, outputs a second signal by comparing a load of previous frame data with a limit load, and outputs a driving voltage control signal for controlling the driving voltage to the power supply based on the first signal and the second signal.

14 Claims, 7 Drawing Sheets

CONTROLLER, DISPLAY DEVICE INCLUDING THE SAME, AND METHOD OF DRIVING DISPLAY DEVICE USING THE SAME

This application claims priority to Korean Patent Application No. 10-2022-0015314, filed on Feb. 7, 2022, and all the benefits accruing therefrom under 35 U.S.C. § 119, the content of which in its entirety is herein incorporated by reference.

BACKGROUND

1. Field

Embodiments relate to a display device. More particularly, embodiments related to a controller for controlling power consumption, a display device including the controller, and a method of driving a display device using the controller.

2. Description of the Related Art

A display device may include a display panel and a controller. The display panel may display an image based on input data including a plurality of frame data. The controller may control driving of the display panel.

In such a display device, the controller may adjust a luminance of the display panel according to a load of the input data to prevent an increase in power consumption of the display device. For example, the controller may reduce the luminance of the display panel when the load of the input data is relatively large, and may not reduce the luminance of the display panel when the load of the input data is relatively small. A delay of one frame may occur in determining of a load of input data.

SUMMARY

In a display device where a delay of one frame occurs in determining of a load of input data, a load of $(N-1)^{th}$ frame data may be relatively small, and a load of $N^{th}$ frame data may be relatively large. In this case, a relatively large scale factor generated based on the load of the $(N-1)^{th}$ frame data may be applied to the $N^{th}$ frame data, so that the luminance of the display panel may not be reduced in an $N^{th}$ frame. Accordingly, the power consumption of the display device may be increased.

Embodiments provide a controller for preventing an increase in power consumption of a display device.

Embodiments provide a display device including the controller.

Embodiments provide a method of driving a display device using the controller.

A display device according to embodiments includes a display panel including a plurality of pixels, a power supply which provides a driving voltage to the pixels, and a controller which outputs a first signal by comparing a sensing driving current generated by sensing driving currents flowing through the pixels with a limit current, outputs a second signal by comparing a load of previous frame data with a limit load, and outputs a driving voltage control signal for controlling the driving voltage to the power supply based on the first signal and the second signal.

In an embodiment, the controller may output the driving voltage control signal for reducing the driving voltage when the sensing driving current is greater than or equal to the limit current, and the load of the previous frame data is less than or equal to the limit load.

In an embodiment, the limit load may be about 75% of a maximum load of frame data.

In an embodiment, the limit current may be less than a maximum driving current flowing through the display panel.

In an embodiment, the controller may include an overcurrent determiner which outputs the first signal by comparing the sensing driving current with the limit current, an overpower determiner which outputs the second signal by comparing the load of the previous frame data with the limit load, and a driving voltage controller which outputs the driving voltage control signal to the power supply based on the first signal and the second signal.

In an embodiment, the driving voltage controller may include a driving voltage control code generator which outputs a driving voltage control code based on the first signal and the second signal, and a digital-to-analog converter which converts the driving voltage control code into the driving voltage control signal.

In an embodiment, the controller may further include a load sum calculator which calculates a sum of all grayscales of the previous frame data.

In an embodiment, the controller may further include a load calculator which calculates the load of the previous frame data based on the sum of all the grayscales of the previous frame data.

A controller according to embodiments includes an overcurrent determiner which outputs a first signal by comparing a sensing driving current generated by sensing a driving current flowing through a display panel with a limit current, an overpower determiner which outputs a second signal by comparing a load of previous frame data with a limit load, and a driving voltage controller which outputs a driving voltage control signal for controlling a driving voltage provided to the display panel based on the first signal and the second signal.

In an embodiment, the driving voltage controller may output the driving voltage control signal for reducing the driving voltage when the sensing driving current is greater than or equal to the limit current, and the load of the previous frame data is less than or equal to the limit load.

In an embodiment, the limit load may be about 75% of a maximum load of frame data.

In an embodiment, the limit current may be less than a maximum driving current flowing through the display panel.

In an embodiment, the driving voltage controller may include a driving voltage control code generator which outputs a driving voltage control code based on the first signal and the second signal, and a digital-to-analog converter which converts the driving voltage control code into the driving voltage control signal.

In an embodiment, the controller may further include a load sum calculator which calculates a sum of all grayscales of the previous frame data.

In an embodiment, the controller may further include a load calculator which calculates the load of the previous frame data based on the sum of all the grayscales of the previous frame data.

A method of driving a display device according to embodiments includes providing a driving voltage to a plurality of pixels, outputting a first signal by comparing a sensing driving current generated by sensing driving currents flowing through the pixels with a limit current, outputting a second signal by comparing a load of previous frame data with a limit load, and controlling the driving voltage based on the first signal and the second signal.

In an embodiment, the controlling the driving voltage may include reducing the driving voltage when the sensing driving current is greater than or equal to the limit current, and the load of the previous frame data is less than or equal to the limit load.

In an embodiment, the limit load may be about 75% of a maximum load of frame data.

In an embodiment, the limit current may be less than a maximum driving current allowed to flow through the display panel.

In an embodiment, the controlling the driving voltage may include outputting a driving voltage control code based on the first signal and the second signal, converting the driving voltage control code into a driving voltage control signal, and controlling the driving voltage based on the driving voltage control signal.

In the controller, the display device, and the method of driving the display device according to the embodiments, the driving voltage may be controlled by comparing the sensing driving current and the limit current and by comparing the load of the previous frame data, that is, $(N-1)^{th}$ frame data when the current frame is $N^{th}$ frame, and the limit load, such that an increase in the power consumption of the display device may be effectively prevented. In such embodiments, the driving voltage may be reduced when the sensing driving current is greater than or equal to the limit current and the load of the previous frame data is less than or equal to the limit load, such that the power consumption of the display device may be decreased.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
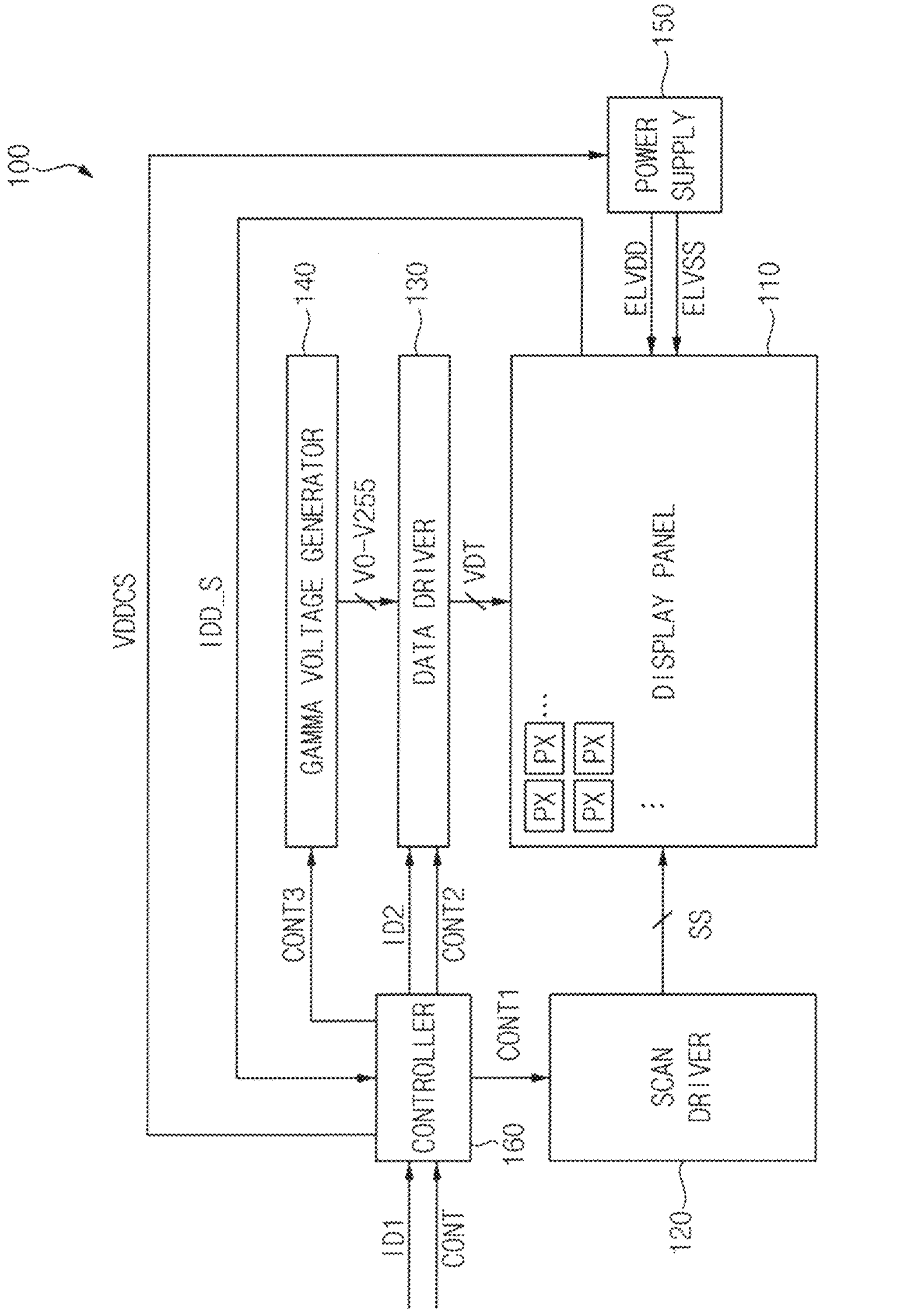
FIG. 1 is a block diagram showing a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a display device, a controller, and a method of driving a display device according to embodiments of the disclosure will be described in detail with reference to the accompanying drawings.

FIG. 1 is a block diagram showing a display device 100 according to an embodiment of the disclosure.

Referring to FIG. 1, an embodiment of a display device 100 may include a display panel 110, a scan driver 120, a data driver 130, a gamma voltage generator 140, a power supply 150, and a controller 160.

The display panel 110 may display an image. The display panel 110 may include various display elements such as an organic light-emitting diode (OLED). Hereinafter, embodiments of the display device 100 including an organic light-emitting diode as a display element will be described for convenience. However, the disclosure is not limited thereto, and alternatively, the display device 100 may include various display elements such as a liquid crystal display (LCD) element, an electrophoretic display (EPD) element, and an inorganic light-emitting diode.

The display panel 110 may include a plurality of pixels PX. Each of the pixels PX may be electrically connected to a data line (DL of FIG. 2) and a scan line (SL of FIG. 2). In addition, each of the pixels PX may be electrically connected to a driving voltage line (VDDL of FIG. 2) and a common voltage line (VSSL of FIG. 2), and may receive a driving voltage ELVDD and a common voltage ELVSS from the driving voltage line VDDL and the common voltage line VSSL, respectively.

Each of the pixels PX may emit a light with a luminance corresponding to a data voltage VDT provided thereto through the data line DL in response to a scan signal SS provided through the scan line SL. A configuration and an operation of the pixel PX will be described below with reference to FIG. 2.

The scan driver 120 (or a gate driver) may generate the scan signal SS (or a gate signal) based on a first control signal CONT1, and provide the scan signal SS to the scan line SL. The first control signal CONT1 may include a start signal, a clock signal, and the like. In an embodiment, for example, the scan driver 120 may sequentially generate and output the scan signal SS corresponding to the start signal by using the clock signal. The scan driver 120 may be implemented as a shift register, but embodiments are not limited thereto. According to an embodiment, the scan driver 120 may be disposed or formed on the display panel 110. According to an alternative embodiment, the scan driver 120 may be implemented as an integrated circuit ("IC"), and mounted on a flexible circuit board to be connected to the display panel 110.

The data driver 130 may generate the data voltage VDT based on output image data ID2, a second control signal CONT2, and gamma voltages V0 to V255, and provide the data voltage VDT to the data line DL. The second control signal CONT2 may include a load signal, a start signal, a clock signal, and the like. According to an embodiment, the data driver 130 may be implemented as an IC (e.g., a driving IC), and mounted on a flexible circuit board so as to be connected to the display panel 110.

The gamma voltage generator 140 (or a grayscale voltage generator) may generate a plurality of gamma voltages V0 to V255 for a plurality of grayscales based on a third control signal CONT3, and provide the gamma voltages V0 to V255 to the data driver 130.

Hereinafter, embodiments where a total of 256 grayscales from a 0-grayscale (minimum grayscale) to a 255-grayscale (maximum grayscale) are present will be described for convenience of description, but more grayscales may be present. In an embodiment, for example, a total of 256 grayscales may be present when image data ID1 has 8 bits. Alternatively, a total of 512 grayscales may be present when the image data ID1 has 9 bits. In such embodiments, a minimum grayscale may refer to a darkest grayscale, and a maximum grayscale may refer to a brightest grayscale.

The power supply 150 may provide the driving voltage ELVDD and the common voltage ELVSS to the display panel 110. A voltage level of the driving voltage ELVDD may be higher than a voltage level of the common voltage ELVSS. The voltage level of the driving voltage ELVDD may be controlled based on a driving voltage control signal VDDCS.

The controller 160 may receive the image data ID1 and an input control signal CONT from an outside (e.g., a graphic processor). The image data ID1 may include grayscale values corresponding to the pixels PX. The input control signal CONT may include a vertical synchronization signal, a horizontal synchronization signal, a main clock signal, a data enable signal, and the like.

The controller 160 may generate the output image data ID2 based on the image data ID1, and may generate the first control signal CONT1, the second control signal CONT2, and the third control signal CONT3 based on the input control signal CONT. The controller 160 may provide the first control signal CONT1 to the scan driver 120, provide the second control signal CONT2 and the output image data ID2 to the data driver 130, and provide the third control signal CONT3 to the gamma voltage generator 140. In addition, the controller 160 may receive a sensing driving current IDD_S generated by sensing driving currents flowing in the pixels PX included in the display panel 110, and may provide the driving voltage control signal VDDCS for controlling the driving voltage ELVDD to the power supply 150.

In an embodiment, as shown in FIG. 1, the controller 160 may be implemented independently of the data driver 130, but the disclosure is not limited thereto. In an alternative embodiment, for example, the controller 160 may be implemented as a single IC together with the data driver 130.

A configuration and an operation of the controller 160 will be described below with reference to FIGS. 3 to 7.

In an embodiment, as shown in FIG. 1, the gamma voltage generator 140 may be implemented independently of the data driver 130 or the controller 160, but the disclosure is not limited thereto. In an alternative embodiment, for example, the gamma voltage generator 140 may be implemented as a single IC together with the data driver 130 or the controller 160, or may be included in the data driver 130 or the controller 160 to be partially or entirely implemented in software.

Figure 2:
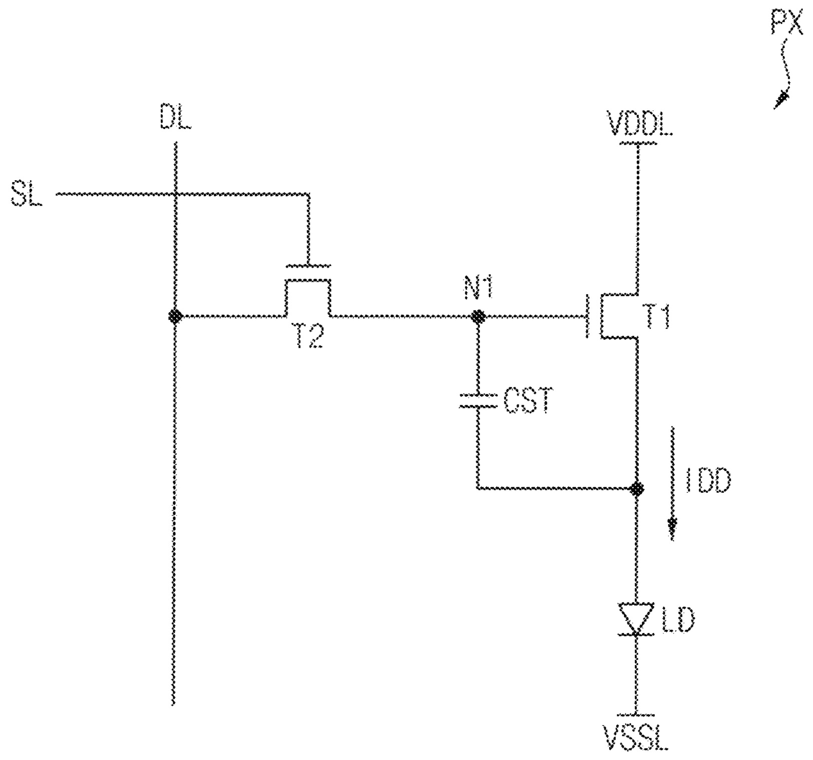
FIG. 2 is a circuit diagram showing a pixel included in the display device of FIG. 1.

FIG. 2 is a circuit diagram showing a pixel PX included in the display device 100 of FIG. 1.

Referring to FIGS. 1 and 2, according to an embodiment, the pixel PX may include a first transistor T1, a second transistor T2, a storage capacitor CST, and a light-emitting element LD.

A first electrode (e.g., a source electrode) of the first transistor T1 may be connected to the driving voltage line VDDL through which the driving voltage ELVDD is transmitted, and a second electrode (e.g., a drain electrode) of the first transistor T1 may be connected to a first electrode of the light-emitting element LD. A gate electrode of the first transistor T1 may be connected to a first node N1. The first transistor T1 may be referred to as a driving transistor.

A first electrode (e.g., a source electrode) of the second transistor T2 may be connected to the data line DL through which the data voltage VDT is transmitted, and a second electrode (e.g., a drain electrode) of the second transistor T2 may be connected to the first node N1. A gate electrode of the second transistor T2 may be connected to the scan line SL through which the scan signal SS is transmitted. The second transistor T2 may be referred to as a switching transistor or a scan transistor.

According to an embodiment, as shown in FIG. 2, each of the first and second transistors T1 and T2 may be an N-type transistor. According to an alternative embodiment, at least one selected from the first transistor T1 and the second transistor T2 may be a P-type transistor.

A first electrode of the storage capacitor CST may be connected to the first node N1, and a second electrode of the storage capacitor CST may be connected to the second electrode of the first transistor T1.

The first electrode (e.g., an anode electrode) of the light-emitting element LD may be connected to the second electrode of the first transistor T1, and a second electrode (e.g., a cathode electrode) of the light-emitting element LD may be connected to the common voltage line VSSL through which the common voltage ELVSS is transmitted. According to an embodiment, the light-emitting element LD may be an organic light-emitting diode. According to an alternative embodiment, the light-emitting element LD may be an inorganic light-emitting diode or a quantum dot light-emitting diode.

When the scan signal SS having a turn-on level (e.g., a high level) is applied to the scan line SL, the second transistor T2 may be turned on. When the second transistor T2 is turned on, the data voltage VDT applied to the data line DL may be transmitted to the first node N1, and the data voltage VDT may be stored in the storage capacitor CST.

A driving current IDD corresponding to a voltage difference between the first electrode and the second electrode of the storage capacitor CST may flow between the first electrode and the second electrode of the first transistor T1. The light-emitting element LD may emit a light with a luminance corresponding to the driving current IDD applied from the first transistor T1.

Next, when the scan signal SS having a turn-off level (e.g., a low level) is applied to the scan line SL, the second transistor T2 may be turned off. Accordingly, the data line DL may be electrically separated from the first electrode of the storage capacitor CST, and a voltage stored in the storage capacitor CST may not be changed even when the data voltage VDT is changed.

Although an embodiment in which the pixel PX includes two transistors and one capacitor is shown in FIG. 2, the disclosure is not limited thereto. According to an alternative embodiment, the pixel PX may further include an emission control transistor that is turned on in response to an emission control signal to electrically connect the second electrode of the first transistor T1 to the first electrode of the light-emitting element LD. According to another alternative embodiment, the pixel PX may further include a sensing transistor that is turned on in response to a sensing signal to sense a voltage or a current applied to the second electrode of the first transistor T1 or the first electrode of the light-emitting element LD.

Figure 3:
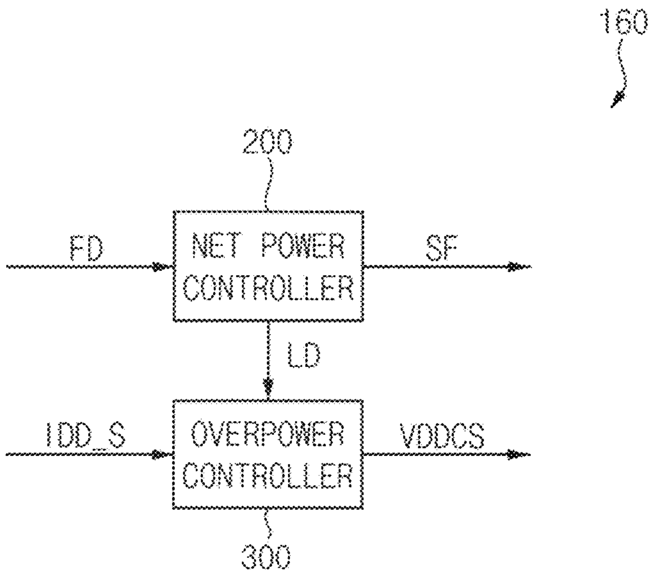
FIG. 3 is a block diagram showing a controller according to an embodiment of the disclosure.

FIG. 3 is a block diagram showing a controller 160 according to an embodiment of the disclosure.

Referring to FIG. 3, an embodiment of the controller 160 may include a net power controller 200 and an overpower controller 300.

The net power controller 200 may output a scale factor SF for adjusting a grayscale of frame data FD based on the frame data FD. The overpower controller 300 may output the driving voltage control signal VDDCS based on the sensing driving current IDD_S and a load LD of the frame data FD.

Figure 4:
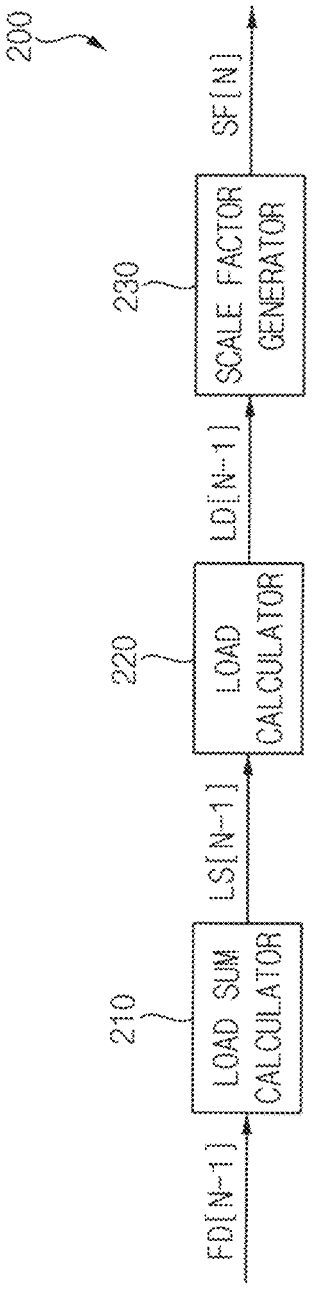
FIG. 4 is a block diagram showing a net power controller included in the controller of FIG. 3.
Figure 5:
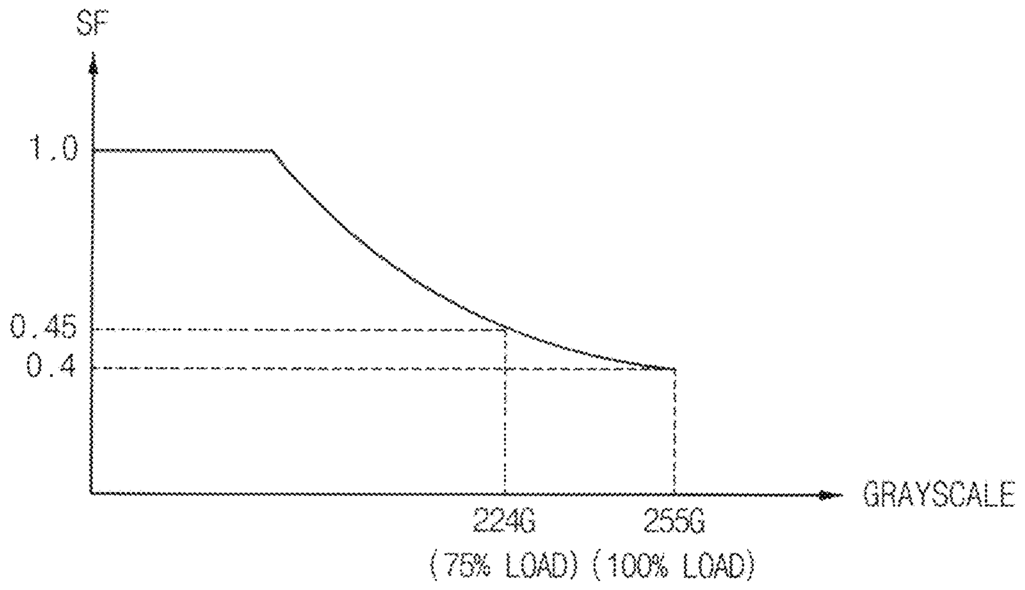
FIG. 5 is a graph showing a scale factor according to a grayscale of frame data.

FIG. 4 is a block diagram showing a net power controller 200 included in the controller 160 of FIG. 3. FIG. 5 is a graph showing a scale factor SF according to a grayscale of frame data.

Referring to FIG. 4, in an embodiment, the net power controller 200 may include a load sum calculator 210, a load calculator 220, and a scale factor generator 230.

The load sum calculator 210 may calculate a sum LS[N−1] of all grayscales of $(N-1)^{th}$ frame data FD[N−1] based on the $(N-1)^{th}$ frame data FD[N−1]. In an embodiment, for example, the display panel 110 may be divided into a plurality of blocks, and the load sum calculator 210 may calculate a sum of grayscales of each of the blocks. The load sum calculator 210 may calculate the sum LS[N−1] of all the grayscales of the $(N-1)^{th}$ frame data FD[N−1] by summing up the sums of the grayscales of the blocks. Here, N may be a natural number that is greater than or equal to 2. Here, $(N-1)^{th}$ frame may be a previous frame.

The load calculator 220 may calculate a load LD[N−1] of the $(N-1)^{th}$ frame data FD[N−1] based on the sum LS[N−1] of all the grayscales of the $(N-1)^{th}$ frame data FD[N−1]. The load LD[N−1] may have a value between 0% and 100%, that is, a value equal to or greater than 0% and equal to or less than 100%. In an embodiment, for example, when the $(N-1)^{th}$ frame data FD[N−1] represents a full-black (e.g., 0-grayscale) image, the load LD[N−1] may be 0%. In an embodiment, for example, when the $(N-1)^{th}$ frame data FD[N−1] represents a full-white (e.g., 255-grayscale) image, the load LD[N−1] may be 100%.

The scale factor generator 230 may generate a scale factor SF[N] based on the load LD[N−1] of the $(N-1)^{th}$ frame data FD[N−1]. In such an embodiment, the scale factor SF[N] may have a value that is less than or equal to 1 to maintain or decrease the grayscale of the $(N-1)^{th}$ frame data FD[N−1]. In an embodiment, for example, when the scale factor SF[N] is 0.5, the grayscale of the $(N-1)^{th}$ frame data FD[N−1] may be decreased by half.

As shown in FIG. 5, the scale factor SF may have a value that is equal to 1 from the 0-grayscale to a specific grayscale, and the value of the scale factor SF may be decreased from 1 to a specific value as a grayscale of frame data increases from the specific grayscale to the 255-grayscale. In an embodiment, for example, the value of the scale factor SF may be decreased from 1 to 0.4 as the grayscale of the frame data increases from the specific grayscale to the 255-grayscale. Since the value of the scale factor SF is less than 1 from the specific grayscale to the 255-grayscale, the grayscale of the frame data may be decreased. Accordingly, the driving current IDD of the display panel 110 may be effectively prevented from being increased.

In an embodiment, as shown in FIG. 4, a delay of one frame may occur for the net power controller 200 to generate the scale factor SF[N]. In such an embodiment, the scale factor SF[N] generated based on the $(N-1)^{th}$ frame data FD[N−1] may be applied to $N^{th}$ frame data FD[N].

Figure 6:
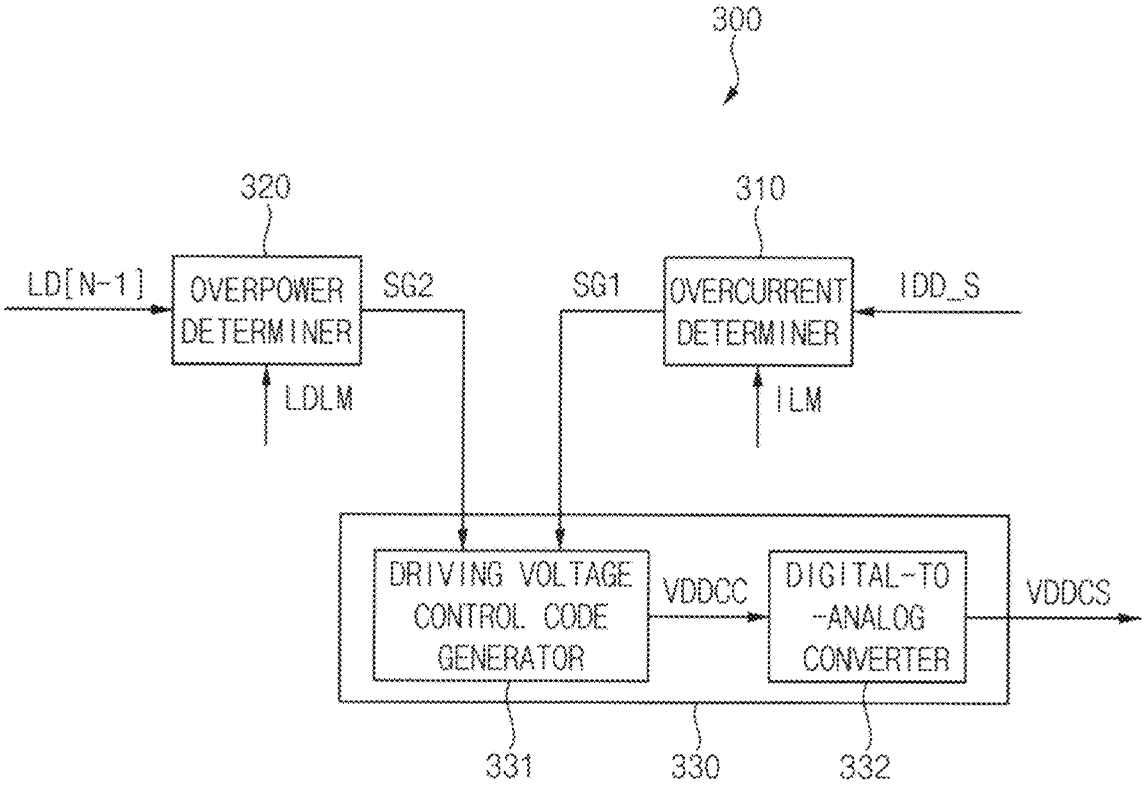
FIG. 6 is a block diagram showing an overpower controller included in the controller of FIG. 3.

FIG. 6 is a block diagram showing an overpower controller 300 included in the controller 160 of FIG. 3.

Referring to FIG. 6, in an embodiment, the overpower controller 300 may include an overcurrent determiner 310, an overpower determiner 320, and a driving voltage controller 330.

The overcurrent determiner 310 may output a first signal SG1 by comparing the sensing driving current IDD_S with a limit current ILM. The limit current ILM may be a predetermined current corresponding to an upper limit of a predetermined driving current IDD. Power consumption of the display panel 110 may be proportional to a magnitude of the driving current IDD and a magnitude of the driving voltage ELVDD. Accordingly, the power consumption of the display panel 110 may be large when the driving current IDD is relatively large, so that the driving voltage ELVDD may be reduced to prevent the power consumption from being increased. Therefore, in an embodiment, when the sensing driving current IDD_S is greater than or equal to the limit current ILM, the overcurrent determiner 310 may output the first signal SG1 having a high level to reduce the driving voltage ELVDD. In such an embodiment, when the sensing driving current IDD_S is less than the limit current ILM, the overcurrent determiner 310 may output the first signal SG1 having a low level.

The overpower determiner 320 may output a second signal SG2 by comparing the load LD[N−1] of the $(N-1)^{th}$ frame data FD[N−1] with a limit load LDLM. The limit load LDLM may be a predetermined load corresponding to a reference load or criterion for determining a size of the load LD[N−1] of the $(N-1)^{th}$ frame data FD[N−1]. According to an embodiment, the overpower determiner 320 may receive the load LD[N−1] of the $(N-1)^{th}$ frame data FD[N−1] from the load calculator 220 of the net power controller 200.

When the load LD[N−1] of the $(N-1)^{th}$ frame data FD[N−1] is relatively large (e.g., the $(N-1)^{th}$ frame data FD[N−1] represents an image having a relatively high grayscale), and a load of the $N^{th}$ frame data is relatively large (e.g., the $N^{th}$ frame data represents an image having a relatively high grayscale), the scale factor SF[N] having a relatively small value may be applied to the $N^{th}$ frame data because the load LD[N−1] of the $(N-1)^{th}$ frame data FD[N−1] may be relatively large. Accordingly, the driving current IDD of the display panel 110 may be relatively small in an $N^{th}$ frame. Therefore, the power consumption of the display panel 110 may not be increased in the $N^{th}$ frame. In addition, even when the sensing driving current IDD_S is greater than the limit current ILM, in a case where the load LD[N−1] of the $(N-1)^{th}$ frame data FD[N−1] is relatively large, the scale factor SF[N] may be small, so that an increase in the power consumption of the display panel 110 may be relatively small.

However, when the load LD[N−1] of the $(N-1)^{th}$ frame data FD[N−1] is relatively small (e.g., the $(N-1)^{th}$ frame data FD[N−1] represents an image having a relatively low grayscale), and the load of the $N^{th}$ frame data is relatively large, the scale factor (SF[N]) having a relatively large value may be applied to the $N^{th}$ frame data because the load LD[N−1] of the $(N-1)^{th}$ frame data FD[N−1] may be relatively small. Accordingly, the driving current IDD of the display panel 110 may be relatively large in the $N^{th}$ frame. Therefore, the power consumption of the display panel 110 may be increased in the $N^{th}$ frame.

Therefore, in an embodiment, when the load LD[N−1] of the $(N-1)^{th}$ frame data FD[N−1] is less than or equal to the limit load LDLM, the overpower determiner 320 may output the second signal SG2 having a high level to reduce the power consumption of the display panel 110. In such an embodiment, when the load LD[N−1] of the $(N-1)^{th}$ frame data FD[N−1] is greater than the limit load LDLM, the overpower determiner 320 may output the second signal SG2 having a low level.

According to an embodiment, the limit load LDLM may be about 75% of a maximum load of the frame data. The maximum load of the frame data may be a load of frame data of a 255-grayscale. In an embodiment, for example, the limit load LDLM may be a load of frame data of a 224-grayscale. According to an embodiment, the overpower determiner 320 may output the second signal SG2 having the high level when the load LD[N−1] of the $(N-1)^{th}$ frame data FD[N−1] is less than or equal to about 75%, and the overpower determiner 320 may output the second signal SG2 having the low level when the load LD[N−1] of the $(N-1)^{th}$ frame data FD[N−1] is greater than about 75%.

The driving voltage controller 330 may output the driving voltage control signal VDDCS for controlling the driving voltage ELVDD based on the first signal SG1 and the second signal SG2. The driving voltage controller 330 may include a driving voltage control code generator 331 and a digital-to-analog converter 332.

The driving voltage control code generator 331 may output a driving voltage control code VDDCC based on the first signal SG1 and the second signal SG2. When both the first signal SG1 and the second signal SG2 have the high level, the driving voltage control code generator 331 may output the driving voltage control code VDDCC for reducing the driving voltage ELVDD. When the first signal SG1 or the second signal SG2 has the low level, the driving voltage control code generator 331 may output the driving voltage control code VDDCC for maintaining the driving voltage ELVDD. Therefore, only when the sensing driving current IDD_S is greater than or equal to the limit current ILM, and the load LD[N−1] of the $(N-1)^{th}$ frame data FD[N−1] is less than or equal to the limit load LDLM, the driving voltage control code generator 331 may output the driving voltage control code VDDCC for reducing the driving voltage ELVDD.

The digital-to-analog converter 332 may convert the driving voltage control code VDDCC into the driving voltage control signal VDDCS. The digital-to-analog converter 332 may convert the driving voltage control code VDDCC, which is a digital signal, into the driving voltage control signal VDDCS, which is an analog signal, to provide the driving voltage control signal VDDCS to the power supply 150.

Figure 7:
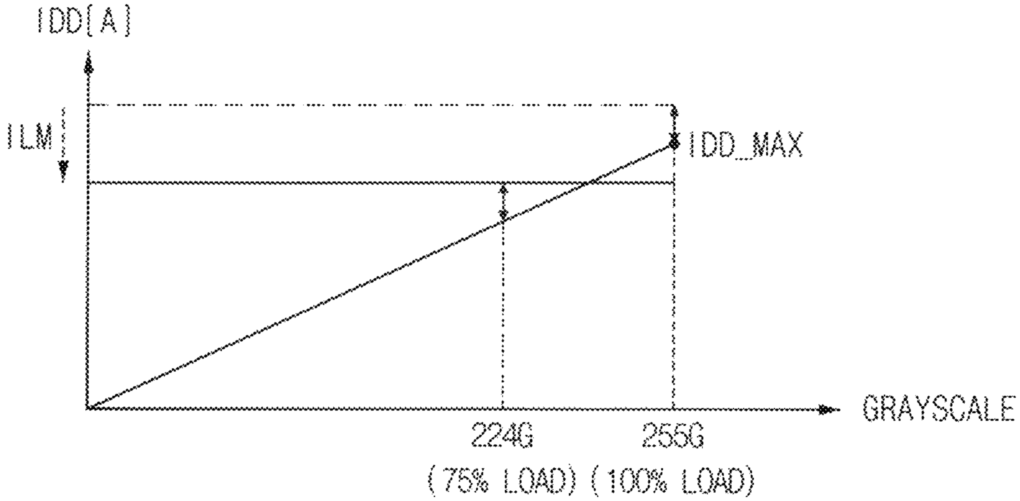
FIG. 7 is a graph showing a driving current according to a grayscale of frame data.

FIG. 7 is a graph showing a driving current according to a grayscale of frame data.

Referring to FIG. 7, as a grayscale of frame data increases from a 0-grayscale to a 255-grayscale, the driving current IDD may be increased from 0 ampere (A) to a maximum driving current IDD_MAX. In an embodiment, for example, the maximum driving current IDD_MAX may be about 20 A. When the limit current ILM is set based on the maximum driving current IDD_MAX, the limit current ILM may be greater than the maximum driving current IDD_MAX by a predetermined margin. In an embodiment, for example, when the limit current ILM is set based on the maximum driving current IDD_MAX of about 20 A, the limit current ILM may be about 22 A.

In a case where the load LD[N−1] of the $(N-1)^{th}$ frame data FD[N−1] is greater than the limit load LDLM, even when the sensing driving current IDD_S is greater than or equal to the limit current ILM, the driving voltage ELVDD may not be reduced. Therefore, the limit current ILM may be set based on the driving current IDD corresponding to the limit load LDLM. Accordingly, the limit current ILM may be reduced as compared with a case where the limit current ILM is set based on the maximum driving current IDD_MAX. According to an embodiment, the limit current ILM may be less than the maximum driving current IDD_MAX. In an embodiment, for example, when the limit current ILM is set based on the driving current IDD corresponding to the limit load LDLM that is a load of 75%, the limit current ILM may be about 18 A. Since the driving current IDD is set to be less than the limit current ILM, when the limit current ILM is reduced, the driving current IDD may be reduced. Accordingly, the power consumption of the display panel 110 may be reduced.

Figure 8:
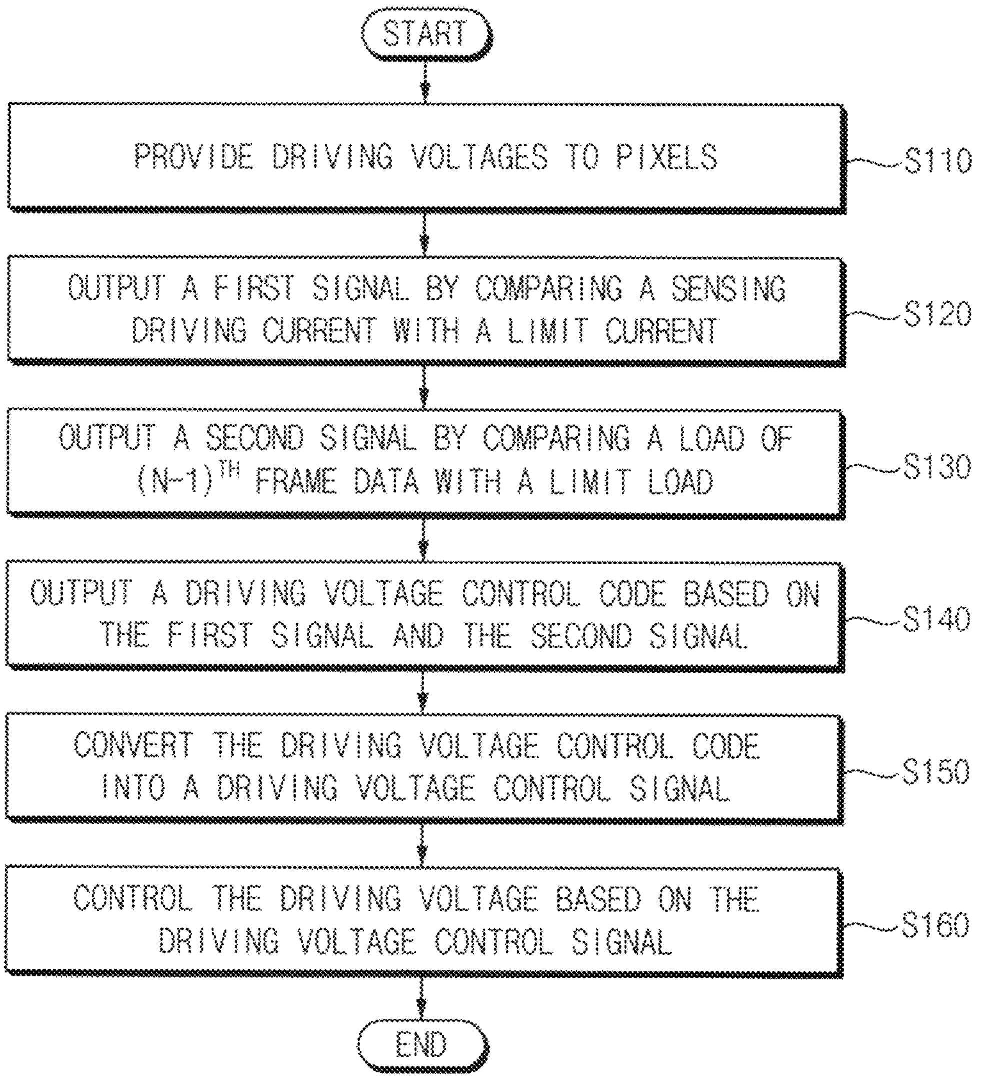
FIG. 8 is a flowchart showing a method of driving a display device according to an embodiment of the disclosure.

FIG. 8 is a flowchart showing a method of driving a display device according to an embodiment of the disclosure.

Referring to FIG. 8, in an embodiment of a method of driving a display device, a power supply 150 may provide a driving voltage ELVDD to a plurality of pixels PX (S110).

Next, an overcurrent determiner 310 may output a first signal SG1 by comparing a sensing driving current IDD_S generated by sensing driving currents IDD flowing through the pixels PX with a limit current ILM (S120). When the sensing driving current IDD_S is greater than or equal to the limit current ILM, the overcurrent determiner 310 may output the first signal SG1 having a high level to reduce the driving voltage ELVDD. When the sensing driving current IDD_S is less than the limit current ILM, the overcurrent determiner 310 may output the first signal SG1 having a low level.

According to an embodiment, the limit current ILM may be less than a maximum driving current IDD_MAX allowed to flow through the display panel 110.

Next, an overpower determiner 320 may output a second signal SG2 by comparing a load LD[N−1] of an $(N-1)^{th}$ frame data FD[N−1] with a limit load LDLM (S130). When the load LD[N−1] of the $(N-1)^{th}$ frame data FD[N−1] is less than or equal to the limit load LDLM, the overpower determiner 320 may output the second signal SG2 having a high level to reduce power consumption of the display panel 110. When the load LD[N−1] of the $(N-1)^{th}$ frame data FD[N−1] is greater than the limit load LDLM, the overpower determiner 320 may output the second signal SG2 having a low level.

According to an embodiment, the limit load LDLM may be about 75% of a maximum load of frame data.

Next, a driving voltage control code generator 331 may output a driving voltage control code VDDCC based on the first signal SG1 and the second signal SG2 (S140). When both the first signal SG1 and the second signal SG2 have the high level, the driving voltage control code generator 331 may output the driving voltage control code VDDCC for reducing the driving voltage ELVDD. When the first signal SG1 or the second signal SG2 has the low level, the driving voltage control code generator 331 may output the driving voltage control code VDDCC for maintaining the driving voltage ELVDD.

Then, a digital-to-analog converter 332 may convert the driving voltage control code VDDCC into the driving voltage control signal VDDCS (S150).

Thereafter, the power supply 150 may control the driving voltage ELVDD based on the driving voltage control signal VDDCS (S160). When the driving voltage control signal VDDCS is a signal for reducing the driving voltage ELVDD, the power supply 150 may reduce the driving voltage ELVDD. When the driving voltage control signal VDDCS is a signal for maintaining the driving voltage ELVDD, the power supply 150 may not change the driving voltage ELVDD.

Figure 9:
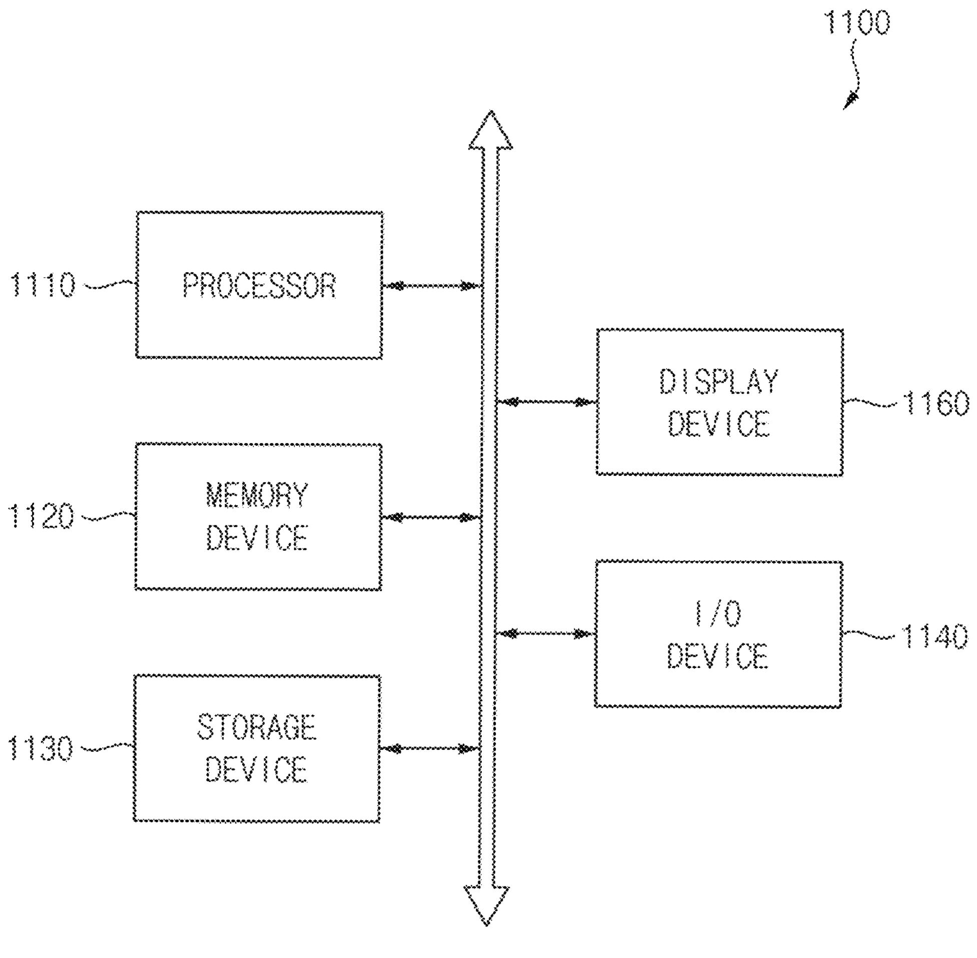
FIG. 9 is a block diagram showing an electronic apparatus including a display device according to an embodiment of the disclosure.

FIG. 9 is a block diagram illustrating an electronic apparatus 1100 including a display device 1160 according to an embodiment.

Referring to FIG. 9, an embodiment of the electronic apparatus 1100 may include a processor 1110, a memory device 1120, a storage device 1130, an input/output ("I/O") device 1140, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The display device 1160 may be coupled to other components via the buses or other communication links.

In the display device 1160, a driving voltage may be controlled by comparing a sensing driving current and a limit current and by comparing a load of $(N-1)^{th}$ frame data and a limit load, so that an increase in power consumption of the display device 1160 may be prevented. In such an embodiment, the driving voltage may be reduced when the sensing driving current is greater than or equal to the limit current and the load of the $(N-1)^{th}$ frame data is less than or equal to the limit load, so that the power consumption of the display device may be decreased.

The display device according to the embodiments may be applied to a display device included in a computer, a notebook, a mobile phone, a smart phone, a smart pad, a portable media player ("PMP"), a portable digital assistant ("PDA"), an MP3 player, or the like.

Although the display devices, the controllers, and the methods of driving the display devices according to the embodiments have been described with reference to the accompanying drawings, the invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of pixels;

a power supply which provides a driving voltage to the pixels; and a controller which outputs a first signal by comparing a sensing driving current generated by sensing driving currents flowing through the pixels with a limit current, outputs a second signal by comparing a load of previous frame data with a limit load, and outputs a driving voltage control signal for controlling the driving voltage to the power supply based on the first signal and the second signal, wherein the limit current is a predetermined current corresponding to an upper limit of a predetermined driving current, wherein the limit load is a predetermined load corresponding to a reference load, and wherein the controller includes:

an overcurrent determiner which outputs the first signal by comparing the sensing driving current with the limit current;

an overpower determiner which outputs the second signal by comparing the load of the previous frame data with the limit load; and a driving voltage controller which outputs the driving voltage control signal to the power supply based on the first signal and the second signal.

2. The display device of claim 1, wherein the controller outputs the driving voltage control signal for reducing the driving voltage when the sensing driving current is greater than or equal to the limit current, and the load of the previous frame data is less than or equal to the limit load.

3. The display device of claim 1, wherein the limit load is about 75% of a maximum load of frame data.

4. The display device of claim 1, wherein the limit current is less than a maximum driving current flowing through the display panel.

5. The display device of claim 1, wherein the driving voltage controller includes:

a driving voltage control code generator which outputs a driving voltage control code based on the first signal and the second signal; and a digital-to-analog converter which converts the driving voltage control code into the driving voltage control signal.

6. The display device of claim 1, wherein the controller further includes a load sum calculator which calculates a sum of all grayscales of the previous frame data.

7. The display device of claim 6, wherein the controller further includes a load calculator which calculates the load of the previous frame data based on the sum of all the grayscales of the previous frame data.

8. A controller comprising:

an overcurrent determiner which outputs a first signal by comparing a sensing driving current generated by sensing a driving current flowing through a display panel with a limit current;

an overpower determiner which outputs a second signal by comparing a load of previous frame data with a limit load; and a driving voltage controller which outputs a driving voltage control signal for controlling a driving voltage provided to the display panel based on the first signal and the second signal.

9. The controller of claim 8, wherein the driving voltage controller outputs the driving voltage control signal for reducing the driving voltage when the sensing driving current is greater than or equal to the limit current, and the load of the $(N-1)^{th}$ frame data is less than or equal to the limit load.

10. The controller of claim 8, wherein the limit load is about 75% of a maximum load of frame data.

11. The controller of claim 8, wherein the limit current is less than a maximum driving current flowing through the display panel.

12. The controller of claim 8, wherein the driving voltage controller includes:

a driving voltage control code generator which outputs a driving voltage control code based on the first signal and the second signal; and a digital-to-analog converter which converts the driving voltage control code into the driving voltage control signal.

13. The controller of claim 8, further comprising:

a load sum calculator which calculates a sum of all grayscales of the $(N-1)^{th}$ frame data.

14. The controller of claim 13, further comprising:

a load calculator which calculates the load of the previous frame data based on the sum of all the grayscales of the previous frame data.

* * * * *